Dec. 9, 1924.  
I. A. SIBLEY, JR  
BRACKET FOR AUTOMOBILE BUMPERS  
Filed March 26, 1921

1,518,414

Witness  
Geo. L. Lawrence

Inventor  
Irving A. Sibley, Jr,  
By Franks Thompson  
Attorney.

Patented Dec. 9, 1924.

1,518,414

UNITED STATES PATENT OFFICE.

IRVING A. SIBLEY, JR., OF CHICAGO, ILLINOIS.

BRACKET FOR AUTOMOBILE BUMPERS.

Application filed March 26, 1921. Serial No. 456,033.

*To all whom it may concern:*

Be it known that I, IRVING A. SIBLEY, Jr., a citizen of the United States, residing at Chicago, in the county of Cook and State of Illinois, have invented new and useful Improvements in Brackets for Automobile Bumpers, of which the following is a full, clear, and exact description.

This invention relates to automobile bumpers and the like, and more particularly to a novel and improved attaching and supporting bracket therefor.

The object of my invention is to provide a bracket for securing a bumper rigidly to the chassis of an automobile particularly in that make of automobile known as the Ford, and to provide a bumper that can be quickly and facilely secured by one bolt to the vehicle, without the necessity of making any structural alterations in the underframe or chassis thereof, and by utilizing in connection therewith the standard parts already in position on the vehicle.

Another object of the invention resides in the provision of a bracket which is simple in construction, durable, easily replaced in case of accident on the road without the services of a skilled mechanic, and capable of being manufactured at low cost.

A more concrete understanding of my invention may be had from the following detail description and the claims, taken in connection with the accompanying drawing, in which:

Figure 1:
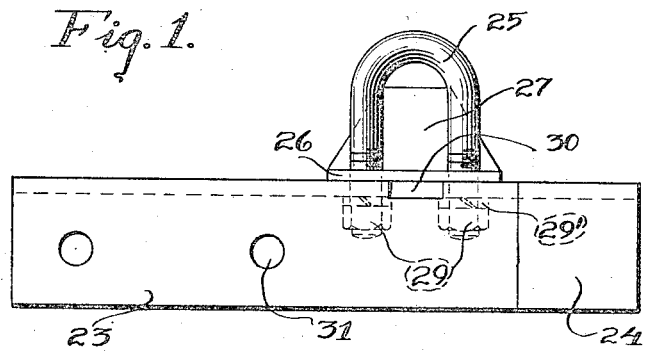
Figure 1 is a side elevation of a bracket embodying my invention.

Referring more particularly to the drawings, 10, and 11, designate, respectively, the side and end channel bars of the chassis of a vehicle reinforced by an angle plate 12, the portion shown being one of the front corners of the chassis on which the fender or mud guard and headlight supports are mounted.

The conventional fender and lamp support, in the present instance, comprises in part, a plate 13 placed against the outer side of channel 10, secured by bolts 14, 14, provided with castellated nuts 15, 15, the lower margin of the plate 13 having a lateral flange 16 engaging beneath the bottom edge of the channel, as at 17. From the plate 13 an arm 18 extends upwardly and outwardly, for a short distance and is then formed with an enlarged horizontal boss 19, and from this an arm 20 extends laterally upward from said boss for supporting the usual fender or mud guard, (not shown). The boss supports a standard 21, secured by a castellated nut 22, a headlight being carried by the upper end of said standard. The foregoing describes the standard construction of the part of a Ford car to which my improvements are applied, and forms no part of my present invention, except in so far as its combination therewith is concerned, as will presently appear.

Coming now to my invention, I provide a longitudinally elongated bracket preferably comprising an angle bar 23 having its rear end, which is adapted to engage the chassis, bent inwardly a sufficient degree to extend beneath and bear against the undersurface of the bottom flange of the side-channel 10, as indicated at 24. A U-bolt, or the like, embraces or hooks over the arm 18 of the fender bracket and the legs of this bolt pass through the base flange 26 of an inclined strut 27, (which describes an obtuse angle in cross section), and the upper horizontal portion 28 of the bracket. Suitable nuts 29 are screwed onto the lower ends of the legs of the bolt and engage split washers 29', which in turn engage the underside of the portion 28, and the upper end of the inclined strut 27 engages beneath the boss 19 and against the nut 22; thus said strut, U-bolt and angular portion 24 of the bracket cooperate, when the nuts 29 are tightened, to retain said bracket in place. It will be noted that the two legs of the U-bolt above the basal flange of the strut bear against the nuts 15, thus making it impossible for the bolt to be canted or bent when tightened. The vertex of the angular transverse contours of the bracket 23 is provided with a notch 30 at a point between the legs of the U-bolt for accommodating the flange 16 on said plate 13.

Figure 2:
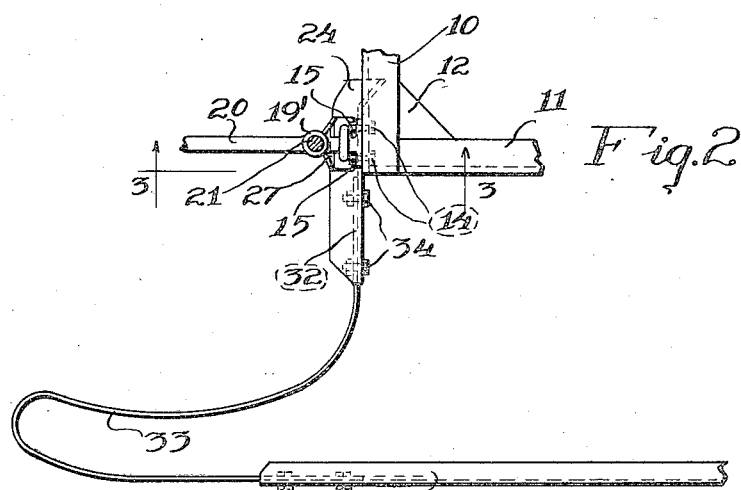
Figure 2 is a fragmentary top plan, illustrating an application of the invention.
Figure 3:
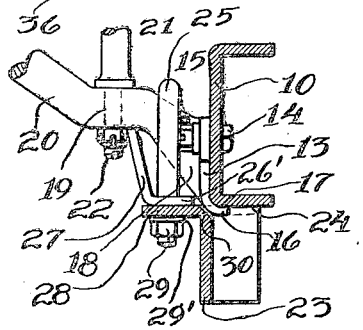
Figure 3 is an enlarged section taken on the line 3. 3, Figure 2, looking in the direction of the arrows.

As will be seen from Figure 2, the bracket 23 extends forward of the chassis and is provided with openings 31 in its vertical portion, and the straight end 32 of a bumper 33 is placed flat against said portion, and suitable bolts and nuts 34 are employed to rigidly secure the end of the bumper thereto.

It will, of course, be understood that the other end of the bumper 36 is similarly connected to a bracket similar to that already described. It will be noted when secured in position my improved bracket makes a three point contact with the frame and fender support, that is, the U-bolt embraces the arm 18, the flange 24 of the supporting plate 13 engages beneath the side frame member, and the strut 27 abuts the nut on the lower end of the lamp standard 21. These points of contact all cooperate rigidly and immovably securing the bumper bracket to the chassis.

While I have described my invention as embodying certain details, it will be understood that I reserve the right to modify the same when necessary without departing from the spirit of the invention and scope of the claims.

What I claim as new is:

1. In a bumper bracket, the combination of a frame member having a laterally extending support thereon, of a bar extending longitudinally of said frame member, a U-shaped bolt passing through said bar and embracing said lateral support, and a member secured to said bar by said U-bolt and bearing against said lateral support, adjacent said U-bolt.

2. A bumper support for vehicles, the combination of a frame member having a lateral support thereon, of a bracket extending longitudinally of said frame member below said lateral support and comprising a U-bolt embracing said lateral support and a strut secured by said U-bolt to said bracket and extending upwardly and laterally and engaging beneath said lateral support.

3. In a bumper bracket, the combination with a frame member having a lateral supporting arm, of an angle bar having one end bent to engage beneath the frame member and the other end projecting beyond said frame member, a U-bolt mounted intermediate the ends of said bar and embracing said lateral support, and a member secured to said bar by said U-bolt and abutting against said lateral support outwardly beyond its point of connection against said U-bolt.

4. In combination, a frame, a rigid support extending laterally upward therefrom, and having an enlarged portion carrying a supplemental support, a bracket extending longitudinally beyond said frame, a U-bolt carried by the bracket and embracing said lateral support and abutting the retaining means thereof, means on the bracket engaging under said frame, and means retained on the bracket by said U-bolt and engaging said enlarged portion.

5. The combination with a frame member, an upwardly and laterally arranged supporting arm having an enlarged horizontal portion, a base plate lying against one side of said frame, and a flange on the lower end of said plate engaging the bottom of said frame, of a bracket comprising an angle bar with its corner presented to the lower corner of said frame member, and provided with a notch to accommodate said flange, and means carried by the bracket for engaging said supporting arm, and also engaging said enlargement and means on the bracket for engaging beneath said frame, for rigidly supporting said bracket on the frame.

6. The combination with a frame member, an upwardly and laterally arranged supporting arm having an enlarged horizontal portion, and a base plate lying against one side of said frame, bolts securing said plate to said frame, and a flange on said plate engaging under said frame, of a bracket comprising an angle bar having its top surface in alinement with the bottom surface of said frame, the corner of said angle bar being notched to accommodate said flange, a U-bolt on said bracket embracing said supporting arm and abutting said bolts, and means on said bracket abutting said enlarged portion.

7. In combination, a frame, a rigid support extending laterally upward therefrom, and having an enlarged portion carrying a supplemental support, a bracket extending longitudinally beyond said frame, a U-bolt carried by the bracket, and embracing said lateral support and abutting the retaining means thereof, means on the bracket engaging under said frame, and means retained on the bracket by said U-bolt and engaging said enlarged portion, a bumper bar, and a spring connecting one end of said bumper bar with the extending end of said bracket.

8. The combination with a frame having a laterally extending support thereon provided with an enlarged horizontal portion, and a vertical standard secured in said horizontal portion and projecting below the same, of a bracket lying parallel to the frame and extending beyond the forward end thereof, said bracket having its rear portion engaging beneath said frame, a U-bolt on the bracket engaging over a portion of said support, and an upwardly inclined plate held on the bracket by said U-bolt and extending upwardly into rigid abutting engagement with said projecting portion of said standard.

In witness whereof I have hereunto set my hand this 17th day of March, 1921.

IRVING A. SIBLEY, JR.

Witnesses:
FRANK D. THAMASEN,
VIOLET WARDELL.